(12) United States Patent
Hasegawa et al.

(10) Patent No.: US 9,166,502 B2
(45) Date of Patent: Oct. 20, 2015

(54) METHOD FOR MANUFACTURING AN ELECTROMECHANICAL TRANSDUCER

(75) Inventors: Yoshihiro Hasegawa, Tama (JP); Yasuyoshi Takai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 407 days.

(21) Appl. No.: 13/587,751

(22) Filed: Aug. 16, 2012

(65) Prior Publication Data

US 2013/0049527 A1    Feb. 28, 2013

(30) Foreign Application Priority Data

Aug. 30, 2011    (JP) .................................. 2011-186731

(51) Int. Cl.
*H04R 31/00*    (2006.01)
*H02N 1/00*    (2006.01)
*H01G 5/16*    (2006.01)

(52) U.S. Cl.
CPC ................. *H02N 1/006* (2013.01); *H01G 5/16* (2013.01); *Y10T 29/43* (2015.01)

(58) Field of Classification Search
CPC .......... H01G 7/00; B06B 1/0292; B06B 1/02; B81C 1/00476; H01L 21/00; H01L 27/1203; H01L 27/00; H01L 23/5226; H01L 29/84; H01L 21/76898; H01L 2224/02372; H01L 23/481; A61B 8/4494; H04R 31/00; H04R 1/00; Y10T 29/435; Y10T 29/49007; Y10T 29/4902
USPC ........... 29/25.42, 592.1, 602.1; 310/330–332, 310/340, 344, 345; 438/53, 54, 64
See application file for complete search history.

(56) References Cited

U.S. PATENT DOCUMENTS

| | | | |
|---|---|---|---|
| 6,430,109 B1 * | 8/2002 | Khuri-Yakub et al. | 367/181 |
| 8,230,576 B2 * | 7/2012 | Masaki | 29/594 |
| 8,288,192 B2 * | 10/2012 | Chang | 438/54 |
| 8,426,235 B2 * | 4/2013 | Chang | 438/53 |
| 8,455,964 B2 * | 6/2013 | Zaitsu et al. | 257/419 |
| 8,658,453 B2 * | 2/2014 | Lemmerhirt et al. | 438/53 |
| 8,754,490 B2 * | 6/2014 | Ezaki et al. | 257/416 |
| 2007/0180916 A1 | 8/2007 | Tian et al. | |
| 2008/0048211 A1 * | 2/2008 | Khuri-Yakub et al. | 257/204 |
| 2011/0073968 A1 | 3/2011 | Ezaki et al. | |

FOREIGN PATENT DOCUMENTS

| | | | |
|---|---|---|---|
| JP | 2006-319712 A | 11/2006 | |
| JP | 2007-215177 A | 8/2007 | |
| JP | 2010-35134 A | 2/2010 | |

* cited by examiner

*Primary Examiner* — Paul D Kim
(74) *Attorney, Agent, or Firm* — Fitzpatrick, Cella, Harper & Scinto

(57) ABSTRACT

The present invention provides a technology for decreasing a dispersion of the performance among electromechanical transducers each having through wiring. A method for manufacturing an electromechanical transducer includes: obtaining a structure in which an insulative portion having a through hole therein is bonded onto an electroconductive substrate; filling the through hole with an electroconductive material to form a through wiring which is electrically connected with the electroconductive substrate; and using the electroconductive substrate as a first electrode, forming a plurality of vibrating membrane portions including a second electrode, which opposes to the first electrode through a plurality of gaps, on an opposite side of the first electrode to the side having the insulative portion, to thereby forming a plurality of cells.

10 Claims, 5 Drawing Sheets

METHOD FOR MANUFACTURING AN ELECTROMECHANICAL TRANSDUCER

BACKGROUND OF THE INVENTION

1. Field of the Invention

The present invention relates to an electromechanical transducer to be used for an ultrasound probe of an ultrasound diagnosis apparatus and the like, and to a method for manufacturing the same.

2. Description of the Related Art

An electromechanical transducer such as an ultrasound transducer conducts at least one of conversion from an electric signal to an ultrasound wave and conversion from the ultrasound to the electric signal, and it is used as a probe for ultrasound diagnosis for medical application, a probe for a non-destructive test and the like. In recent years, along with the development of a fine processing technology, a capacitance type electromechanical transducer (CMUT: Capacitive Micromachined Ultrasonic Transducer) produced by using the technology has been actively developed. An exemplary CMUT has a structure that an element substrate having a cell includes a substrate having a lower electrode (where the substrate occasionally serves as lower electrode as well), a vibrating membrane formed on the substrate so as to keep a fixed space between itself and the lower electrode, and an upper electrode, which element substrate being electrically connected with a driving circuit substrate. Furthermore, the CMUT has a structure in which the element substrate has a plurality of elements to which two or more cells are electrically connected, which element substrate being electrically connected to the driving circuit substrate (see Japanese Patent Application Laid-Open No. 2006-319712). A CMUT with high ability in transmitting or receiving the ultrasound by using a lightweight vibrating membrane, and having excellent broadband characteristics in any of a liquid and an air, can be easily obtained. Consequently, since the use of CMUT enables diagnosis with higher accuracy than that of a conventional medical diagnosis, and CMUT has received attention as a promising technology.

In operating CMUT, when transmitting the ultrasound, the CMUT applies a DC voltage and an AC voltage between the lower electrode and the upper electrode so that the voltages are superimposed. Thereby, the vibrating membrane vibrates and transmits the ultrasound. When receiving the ultrasound, the CMUT detects a signal from a change in the capacitance between the lower electrode and the upper electrode due to the change of a distance between both of the electrodes along with the deformation of the vibrating membrane, which occurs when the vibrating membrane has received the ultrasound. The methods for applying voltage to electrodes for driving the CMUT include: providing an electrode on the surface of the substrate of the CMUT and routing wires which are connected to the upper and lower electrodes; and guiding wires from the upper and lower electrodes to the rear surface of the substrate by using through wiring provided on the substrate, and thereby electrically connecting the electrodes to each other. In the former method, since it is necessary to route the wires on the surface of the substrate, an element can hardly be arranged in a portion occupied by the wire. Therefore, a fill factor, which is expressed by a ratio of the cells occupying in the elements having the same area, decreases. In addition, as for the space between the elements, since it is necessary to arrange the elements so as to be separated from each other by the area occupied by the wire, the elements can hardly be arranged at a high density. As a result, the performance of the CMUT is lowered. On the other hand, in the method of using the through wiring, normally, every element is insulated from each other in the substrate, and the through wiring is formed for the respective elements to electrically connect the electrodes. Thus manufactured CMUT is described in Japanese Patent Application Laid-Open No. 2007-215177 and Japanese Patent Application Laid-Open No. 2010-35134. Since there is need to route wires on the surface of the substrate in the CMUT formed by using the through wiring, the cell can be arranged in the portions occupied by the wires and the element can be arranged at a high density. Therefore, the CMUT having a high fill factor and a high arrangement density of the element can be produced, which leads to the enhancement of the performance.

SUMMARY OF THE INVENTION

In the CMUT of Japanese Patent Application Laid-Open No. 2007-215177, through wiring is formed in the substrate of the CMUT. As a technique for forming the through wiring in the substrate, there are a method of forming the through wiring in the substrate before the element of the CMUT is prepared, and a method of forming the through wiring in the substrate after the element of the CMUT has been formed. However, in the former method, generally, the formation of the through wiring in the substrate leads to, on the surface of the substrate, formation of steps between the substrate and the through wiring. Even if it is tried to flatten the surface with a Chemical Mechanical Polishing (CMP) process or the like, there is a limitation in flatness of the surface of the substrate due to a difference between the materials. When the cells are arranged on the substrate having the steps, the lower electrode, the gap, the vibrating membrane and the upper electrode occasionally result in being unevenly formed as a result of receiving the influence of the steps. Consequently, characteristics of the cell become different between a portion having the through wiring therein and a portion having no through wiring therein, which leads to the lowering of the performance of the CMUT. On the other hand, in the latter method, since the through wiring is prepared after the element substrate has been prepared, it is difficult to arrange the cell right on the through wiring because of limitation by the manufacturing process. Furthermore, since the cell is formed of a thin film which is structurally weak, there is a possibility that a yield decreases in an operation of forming the through wiring.

In the method of Japanese Patent Application Laid-Open No. 2010-35134, the CMUT having the through wiring is formed by forming the elements in the CMUT and then bonding a substrate having the through wiring formed therein to the element substrate. In this technique as well, the substrate of the through wiring is bonded to the element substrate after a structure having fine gaps therein has been formed, and accordingly there is a need that a yield of the element be increased in an operation of bonding the through wiring substrate and an operation after the bonding operation.

With respect to the above described problems, a method for manufacturing an electromechanical transducer includes: obtaining a structure in which an insulative portion having a through hole therein is bonded onto an electroconductive substrate; filling the through hole with an electroconductive material to form a through wiring which is electrically connected with the electroconductive substrate; and using the electroconductive substrate as a first electrode, forming a plurality of vibrating membrane portions including a second electrode, which opposes to the first electrode through a plurality of gaps, on an opposite side of the first electrode to the side having the insulative portion, to thereby forming a plurality of cells.

With respect to the above described problems, the electromechanical transducer of the present invention has a configuration including: a plurality of cells which are formed by mounting a plurality of vibrating membrane portions including a second electrode, which opposes to a first electrode through a plurality of gaps, on a side of the first electrode of an electroconductive substrate, in which the first electrode has an insulative portion bonded onto an opposite side of the side having the gaps, and the insulative portion has a through wiring formed therein which is electrically connected to the first electrode.

According to the present invention, an electromechanical transducer is formed while using an electroconductive substrate as an electrode, after having ensured an electric connection between the electroconductive substrate and a through wiring, by obtaining a structure in which an insulative portion having a through hole is bonded onto the electroconductive substrate, and then filling the through hole with an electroconductive material to form the through wiring. Consequently, the electroconductive substrate can be used as the electrode in such a state that the flatness of the electroconductive substrate is not impaired, and consequently by using the electroconductive substrate of which the precision of the flatness has been guaranteed, the cell can be arranged even right on the through wiring, without being affected by a step between the through wiring and the insulative portion. Consequently, since the cell can be arranged even right on the through wiring, the number of cells arranged in the element of the electromechanical transducer can be increased, thereby the fill factor is enhanced, which leads to the enhancement of the performance. In addition, the dispersion among the cells can be decreased. Furthermore, since the cell which is structurally weak due to fine gaps therein is formed after the through wiring has been formed, the lowering of the yield can be reduced.

Further features of the present invention will become apparent from the following description of exemplary embodiments with reference to the attached drawings.

DESCRIPTION OF THE EMBODIMENTS

Figure 1A:
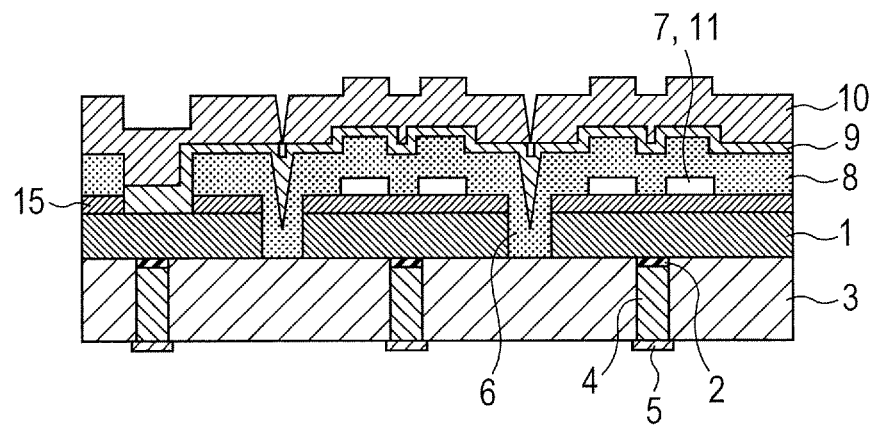
FIGS. 1A and 1B are views illustrating a cross section and an upper surface of a CMUT which is an electromechanical transducer according to the present invention.

Preferred embodiments of the present invention will now be described in detail in accordance with the accompanying drawings.

In the present invention, the electromechanical transducer is configured to have a through wiring that is formed by producing a structure in which an insulative portion having a through hole therein is bonded onto an electroconductive substrate, and then filling the through hole with an electroconductive material, the through wiring being electrically connected to a electroconductive substrate, and have a plurality of cells formed on the electroconductive substrate. Based on such conception, the electromechanical transducer of the present invention and the method for manufacturing the same have a basic constitution as was described in the section of the summary of the invention. The structure can be obtained by a method which includes bonding an insulative substrate that is the insulative portion having the through hole formed therein onto the electroconductive substrate, as will be described in Exemplary Embodiment 1 which will be described later. Another method can also be adopted which includes forming a photosensitive insulative portion on the electroconductive substrate to bond the insulative portion with the electroconductive substrate, and forming a through hole which reaches the electroconductive substrate in the photosensitive insulative portion, as will be described in Exemplary Embodiment 2 which will be described later.

Furthermore, when the second electrode is used in common for a plurality of elements each containing at least one cell, the method may also include electrically separating the first electrode for every element. In this case, the method may also include forming a portion that is a portion of the electroconductive substrate, which has been electrically separated from the first electrode, and which is electrically connected to any one of the through wirings, and electrically connecting the common second electrode to the portion. On the other hand, the first electrode can also be made common for the plurality of the elements. In this case, a plurality of portions that are a plurality of portions of the electroconductive substrate can be formed, which are electrically separated from the first electrode, and that are electrically connected to each corresponding through wiring, electrically separate the second electrodes for every element, and electrically connect each of the second electrodes to each of the portions. In addition, the vibrating membrane portion may be formed so as to have the vibrating membrane provided through a gap and the second electrode formed on the vibrating membrane, or it may be formed of an electroconductive vibrating membrane which serves also as the second electrode.

The electromechanical transducer and the method for manufacturing the same to which the present invention can be applied will be described below with reference to the drawings, while taking CMUT as an example. Incidentally, the same portions in between the following exemplary embodiments will be designated by the same reference numerals, so that the description will be simplified.

Figure 1B:
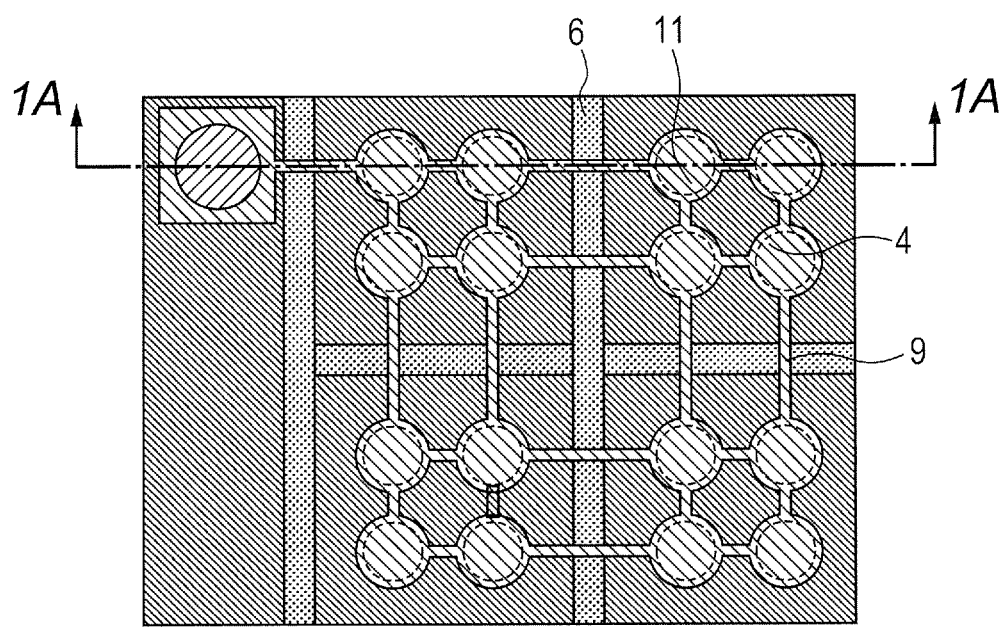

FIGS. 1A and 1B are schematic views illustrating a structure of CMUT of an exemplary embodiment which is manufactured with a manufacturing method of the present invention. FIG. 1A is a cross-sectional view taken along the line 1A-1A of FIG. 1B; and FIG. 1B is a top plan view of CMUT. The CMUT which has been manufactured with the manufacturing method of the present invention includes a substrate 1, an insulative substrate or a member 3 having a through wiring 4 therein, and a CMUT device formed on the substrate 1. The CMUT device includes: a vibrating membrane 8 which is formed on the substrate 1 that serves also as a first electrode, through a gap 7 (approximately vacuum void, void filled with gas, or the like); a second electrode 9; and a cell 11 including a sealing film 10. Here, the vibrating membrane 8, the second electrode 9 and the sealing film 10 constitute a vibrating membrane portion. In addition, the CMUT device has a large number of elements to which a plurality of cells 11 are electrically connected, and the elements are two-dimensionally arrayed. In each element, one or more (one in illustrated example) through wirings 4 are connected to the substrate 1 which becomes a common first electrode. Here, the second electrode 9 becomes a common electrode for all of the elements. In the present exemplary embodiment, this common second electrode 9 is electrically connected to a portion of the substrate 1 of the first electrode, which has been electrically separated from the substrate, and to the through wiring (a portion of substrate 1 in leftmost portion of FIG. 1A and through wiring 4), and the electric current is taken out to the outside. In the present exemplary embodiment, the substrate 1 which is the first electrode is individually electrically separated so as to correspond to each element, and the second electrode 9 is used as the common electrode for all of the elements. However, as described above, the substrate 1 of the first electrode may be used as a common electrode, and the second electrode 9 may be individually separated so as to correspond to each element.

The method for manufacturing the CMUT of the present exemplary embodiment includes bonding an insulative substrate or member onto an electroconductive substrate 1 which serves also as a first electrode, forming a through wiring in the insulative substrate to ensure an electric connection with the substrate 1, and forming an electromechanical transducer by using the substrate 1 as the first electrode. In other words, by connecting the insulative substrate having the through wiring therein, to the rear surface of the substrate 1 beforehand, the CMUT can be formed on the substrate 1 in such a state that the flatness of the surface of the substrate 1 is kept. Therefore, if an Si substrate which has the flatness guaranteed and has a low resistivity is used as the substrate 1, it is suppressed that a step which tends to be easily formed when the through wiring is formed occurs on the surface of the substrate, and the CMUT can be formed without being affected by the step, which can enhance the consistency of the performance of the CMUT. In addition, since the cell 11 of the CMUT can be formed even right on the through wiring, a fill factor can be enhanced, and the performance of the CMUT can be enhanced. Furthermore, the through wiring is not formed after the CMUT that has a fine gap therein and thus that is structurally weak has been formed, which can consequently decrease the lowering of the yield occurring when the through wiring is formed.

When the CMUT is formed on a structure having the through wiring therein (which means an object formed by combining the substrate 1 with an insulative substrate or member), a sacrificial layer 13 for forming a gap 7 is film-formed and patterned on the substrate 1 which serves also as the first electrode, and a vibrating membrane 8, for instance, is formed on the substrate 1. Furthermore, a second electrode 9 is film-formed and patterned. Next, an etching hole for removing the sacrificial layer 13 is formed through the vibrating membrane 8, and the gap 7 is formed by selectively removing only the sacrificial layer 13. Then, a sealing film 10 is formed to seal the above described etching hole for removing the sacrificial layer, and then an electromechanical transducer such as the CMUT is produced.

As the substrate 1 to be used in the present exemplary embodiment, an Si substrate is desirable of which the flatness of the surface can be guaranteed (in other words, surface roughness is small value) and which is easy to be subjected to fine processing. In addition, since the substrate 1 serves also as the first electrode, the resistivity of the substrate 1 is desirably 0.02 Ωcm or less. This is because the first electrode having a smaller wiring resistance can more decrease a loss of a signal. Furthermore, the substrate 1 desirably has a surface roughness Rms of 0.5 nm or less. This is because since the CMUT is formed by stacking thin films on the substrate 1, as the surface roughness of the substrate 1 is smaller, the CMUT having smaller dispersion can be formed.

The substrate 1 can employ an active layer of an Silicon on Insulator (SOI) wafer which is produced so as to contain an $SiO_2$ film between Si and Si. Normally, after an element separating groove 6 has been formed, it is necessary to film-form the second electrode 9 which is the upper electrode while showing adequate coverage so that the second electrode 9 surmounts a stage originating in a step formed between the substrate 1 and the insulative portion 3 by the groove 6. However, when the substrate 1 is formed by using an SOI active layer, the substrate 1 can be thinly formed, and accordingly the step to be formed by the element separating groove 6 becomes small, which enhances the stability of the process.

The material for the sacrificial layer 13 to be used in the manufacturing method in the present exemplary embodiment can be selected from materials which have etching selectivity with respect to the vibrating membrane 8 and which have sufficient heat resistance such that the surface roughness is not largely changed by heat when the vibrating membrane 8 is formed. The material is desirably, for instance, Cr or Mo. The material for the second electrode (upper electrode) 9 to be used in the manufacturing method in the present exemplary embodiment may be selected from materials which have sufficient heat resistance such that the surface roughness is not largely changed by heat in heat treatment to be conducted when the sealing film 10 is formed, and which have etching selectivity with respect to the sacrificial layer 13 when the sacrificial layer 13 is etched. For instance, materials such as Ti, W, TiW and Mo can be selected. In addition, the material for the vibrating membrane 8 to be used in the manufacturing method in the present exemplary embodiment is desirably an SiN film of which the stress can be controlled and which is excellent in mechanical characteristics and insulation performance and which is film-formed with PECVD (plasma-enhanced chemical vapor deposition).

Since the sealing film 10 is used also as a vibrating membrane portion, such a material can be selected that not only the film is formed on a sealing portion while showing adequate coverage, but also the stress can be controlled and the film has excellent mechanical characteristics and insulation performance. For instance, an SiN film which can be film-formed with the PECVD can be selected. The material for the insulative substrate or member which forms the through wiring therein in the present exemplary embodiment needs to be a material which is easy to form a through hole that becomes the through wiring and which can be bonded to the substrate 1. For instance, Pyrex (registered trademark) glass or quartz glass can be used. The quartz glass or the Pyrex (registered trademark) glass can have a fine through hole formed therein with a sand blast process or the like, and they can be easily bonded, for instance, to an Si substrate which becomes the substrate 1. Particularly, the Pyrex (registered trademark) glass has an advantage of showing high compatibility with the Si substrate in the heat treatment, because of having a close coefficient of thermal expansion extremely to that of Si which becomes the substrate 1.

Furthermore, a photosensitive resin and a glass material can also be used as an insulative member which forms the through wiring therein. The photosensitive resin material which can be applied with a spin coating method can easily form an applied film, for instance, on the Si substrate, and can also form the through hole therein with a photolithographic technology. In addition, there exist also a material which is excellent in resistance to heat generated when the electromechanical transducer such as the CMUT is formed, and photosensitive polyimide (manufactured by Toray Industries, Inc.), for instance, can be used. Furthermore, a photosensitive dry film (commercial product manufactured by Hitachi, Ltd., Asahi Kasei Corporation, TOKYO OHKA KOGYO CO., LTD. or the like) can also be used as the insulative substrate or member.

A further specific example of a method for manufacturing an electromechanical transducer, to which the present invention can be applied, will be described in detail below with reference to the drawings.

Exemplary Embodiment 1

The exemplary embodiment 1 is concerned to a method for manufacturing the CMUT that is produced on a substrate which is formed of a low-resistance Si substrate and an insulative glass substrate and to which a through wiring is connected. Although a Pyrex (registered trademark) glass is used as an insulative substrate 3 provided with a through hole in the present exemplary embodiment, a basic manufacturing method is the same even when another material such as quartz glass is used.

Figure 2A:
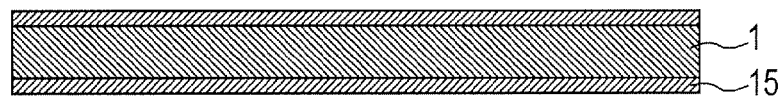
FIGS. 2A, 2B, 2C, 2D, 2E, 2F, 2G, 2H, 2I, 2J, 2K, 2L and 2M are cross-sectional views for describing a process flow of Exemplary Embodiment 1 of a method for manufacturing the electromechanical transducer.

FIGS. 2A to 2M are views for describing a process flow of the present exemplary embodiment. Although a cross section of a device having two elements is illustrated in these views for simplification of the drawings, other elements can also be produced in a similar way. Firstly, an Si substrate which becomes a substrate 1 is prepared (FIG. 2A). Since the substrate 1 serves also as a first electrode which becomes a lower electrode, it is desirably a substrate having a low resistivity. In the present exemplary embodiment, an Si substrate having a resistivity of 0.02 Ωcm or less is used. In addition, since the CMUT is formed on the surface of the substrate 1, the substrate having a small surface roughness Rms as 0.5 nm or less is used. Next, a thermally-oxidized film layer of approximately 1 μm is formed on both surfaces of the substrate 1 as an insulating film 15. Since the thermally-oxidized film to be formed on the Si substrate is excellent in flatness, the insulating film 15 can be formed almost without impairing the flatness of the Si substrate. Because the vibrating membrane 8 as described later has insulating properties, if an electrical isolation between upper and lower electrodes can be sufficiently ensured, the insulating film 15 can be omitted.

Figure 2B:

Next, in order to bring the through wiring portion into ohmic contact with the substrate 1, an oxide film on the rear surface of the Si substrate is stripped, and an ohmic metal 2 is film-formed and patterned. Furthermore, a layer for having the ohmic contact with the Si substrate 1 is formed by being subjected to an annealing treatment. A metal such as Al and Ti which is easy to form an alloy layer with Si is used as a metal for having the ohmic contact (FIG. 2B).

Figure 2C:
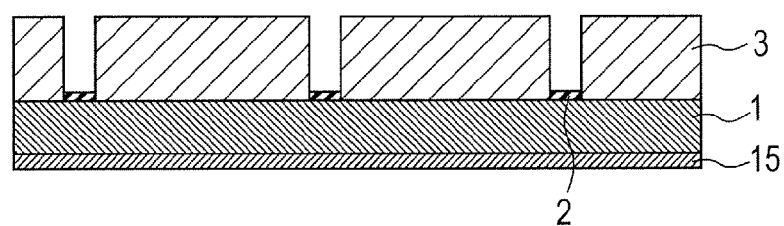

Next, the Pyrex (registered trademark) glass as the insulative substrate 3 provided with the through hole, in which the through hole has been formed with a sandblast method in a portion at which the through wiring is to be formed, is bonded to the rear surface of the substrate 1 so that an ohmic metal 2 overlaps with the through hole (FIG. 2C). The Pyrex (registered trademark) glass and the Si substrate can be bonded to each other by anode bonding or direct bonding. Although the through hole was formed with the sandblast method in the present exemplary embodiment, the method of forming the through hole is not limited to the sandblast method. The through hole can be formed also with a drilling method, a laser machining method, an ultrasonic machining method, and further a method of combining a photolithographic technology with a dry etching technique. In addition, the bonding method between the Pyrex (registered trademark) glass and the Si substrate were, where anodic oxidation is used herein, is not limited to the thereto, and other bonding methods such as direct bonding can also be employed.

Figure 2D:
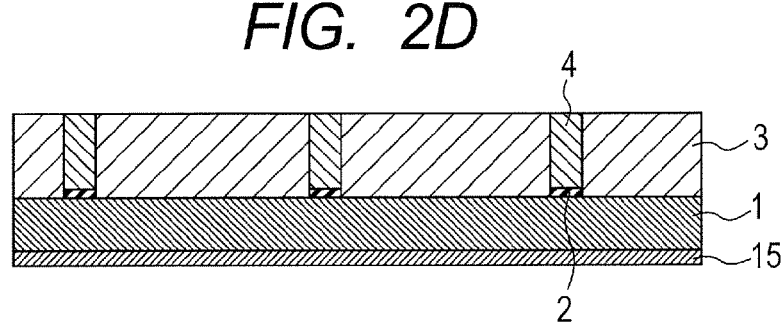
Figure 2E:
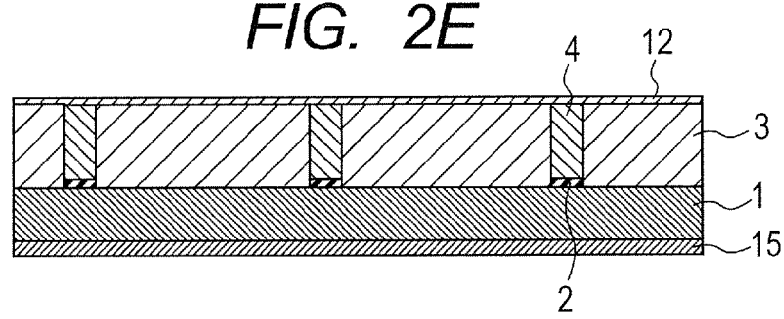

The through hole is filled with an electroconductive material, which becomes the through wiring. Cu by plating is used for the electroconductive material to fill the through hole (FIG. 2D). After the through wiring has been formed, the surface heights of the through wiring 4 and the Pyrex (registered trademark) glass are equalized by polishing the rear surface with CMP. Next, a protective material 12 for protecting the metal which forms the through wiring, in various etching treatments in the processes, is formed on the rear surface of the bonded substrate. In the present exemplary embodiment, Ti having high selectivity in etching and high resistance to heat is film-formed so as to have a thickness of 300 nm with an EB vapor deposition method. By this step, a structure of the substrate having the through wiring 4 formed therein is completed (FIG. 2E).

Next, a process of forming CMUT on the structure of the produced substrate will be described below (FIG. 2F to FIG. 2M). In the method for manufacturing the CMUT of the present exemplary embodiment, a gap is formed with by: patterning beforehand the material which is referred to as a sacrificial layer; then forming a vibrating membrane thereon; and selectively removing the sacrificial layer. Thereby, the electroconductive substrate is used as a first electrode, a plurality of vibrating membrane portions including a second electrode opposing to the first electrode through a plurality of gaps, respectively, are formed, on the first electrode on an opposite side of the side having the insulative portion, and thus a plurality of cells can be formed. Since the CMUT to be produced with this process can be produced at a comparatively low temperature of 350° C. or lower, it can be formed even with a method for forming the CMUT after the through wiring 4 has been formed with decreased affection by the heat.

Figure 2F:
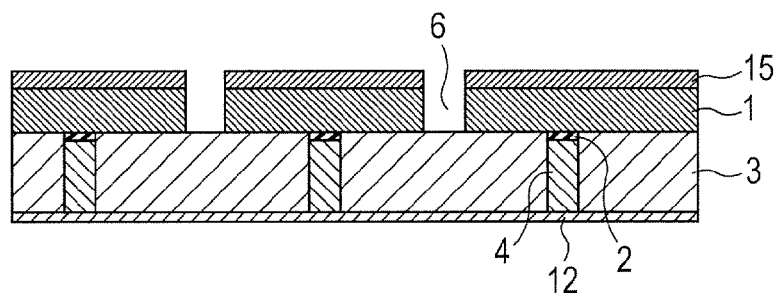

Firstly, a resist is applied onto the surface of the prepared substrate having the through wiring 4 and it is patterned with a photolithographic technology. The resist pattern is used as a mask to subject the substrate 1 as a lower electrode to dry etching by using $SF_6$ as an etching gas, until the substrate 1 is cut down to the face at which an insulative substrate 3 and the substrate 1 are bonded. Thereby, an element separating groove 6 is formed. By this operation, every portion of the substrate 1, which corresponds to each element, is electrically separated from each other (FIG. 2F).

Figure 2G:
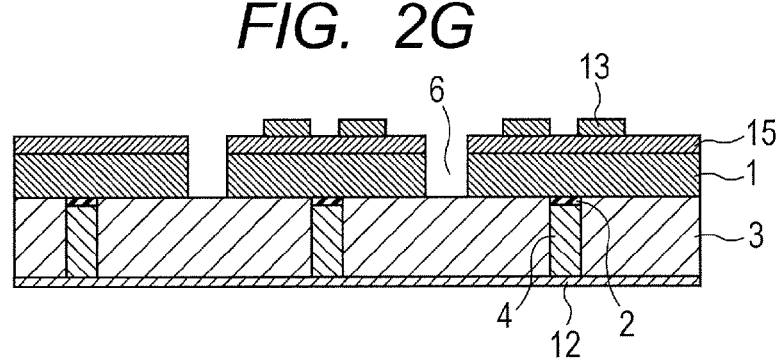

Subsequently, the sacrificial layer 13 is formed and patterned on the substrate 1 (FIG. 2G). The sacrificial layer 13 film-formed of Cr is produced with the EB vapor deposition method. The pattern of the sacrificial layer 13 can be formed by lowering the vacuum degree to $2.0 \times 10^{-4}$ Pa, film-forming Cr of approximately 200 nm with the EB vapor deposition method, then forming a resist mask with the photolithographic technology, and etching Cr with an etchant of a chromic acid mixture (chromium etchant, made by KANTO CHEMICAL CO., INC.).

Figure 2H:
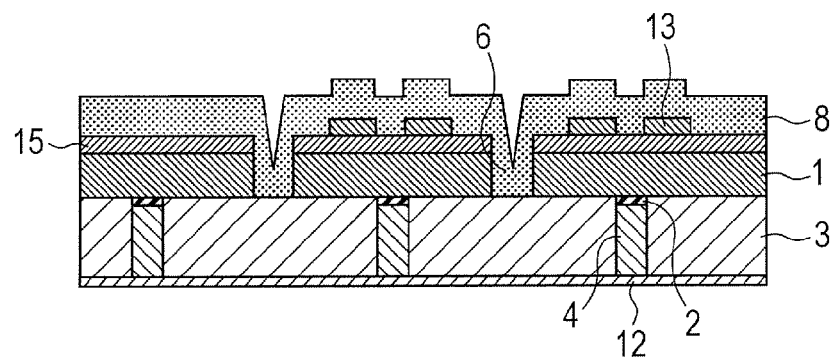
Figure 2I:
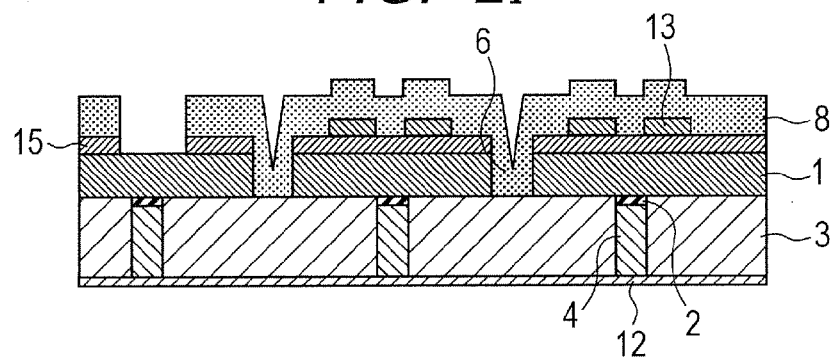

Next, the vibrating membrane 8 is formed on the sacrificial layer 13 (FIG. 2H). In this step, the vibrating membrane 8 is formed with a plasma CVD method to form an SiN film which becomes the vibrating membrane 8. The SiN film with a film thickness of approximately 440 nm can be formed in a mixed gas of $SiH_4$, $N_2$ and $NH_3$ at a substrate heating temperature of 350° C. and a chamber pressure of 1.6 Torr for approximately 200 seconds, and subsequently the vibrating membrane and an insulating film corresponding to an extraction portion of the upper electrode are etched with a dry etching technique using $CF_4$ as an etching gas, in order to form the portion at which the second electrode 9 that becomes the upper electrode is connected with the through wiring 4 (FIG. 2I).

Figure 2J:
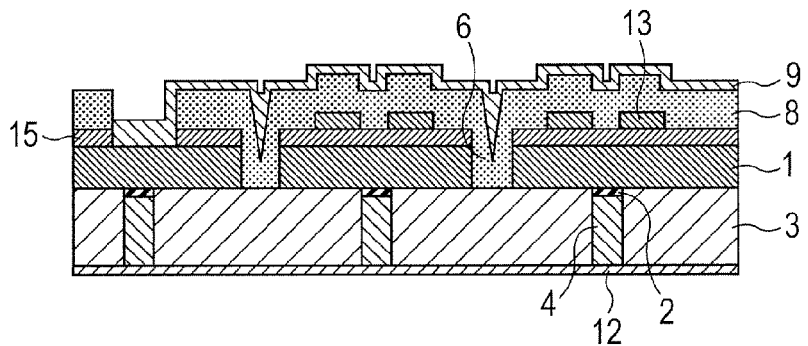

Next, the second electrode 9 which becomes the upper electrode is formed (FIG. 2J). A Ti film which becomes the upper electrode can be formed with an EB vapor deposition method. The Ti film of 100 nm is formed with a vacuum degree of 2.5×10⁻⁴ Pa. Furthermore, a resist mask is formed with a photolithographic technology. In addition, a resist for protecting Ti of the rear surface is formed. Furthermore, a pattern of the upper electrode 9 is formed by etching Ti with a Ti etchant (WLC-T, made by MITSUBISHI GAS CHEMICAL COMPANY, INC.).

Figure 2K:
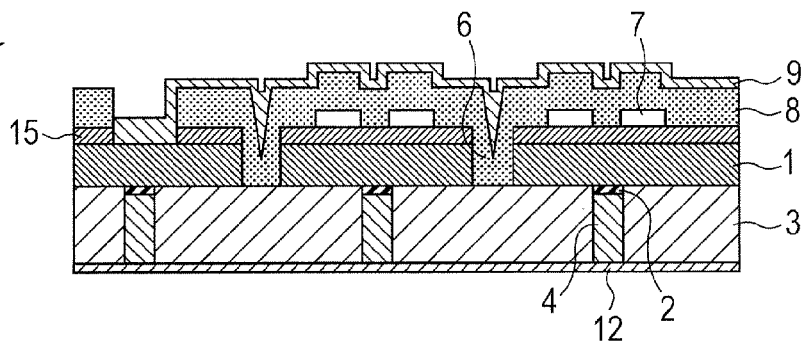

Subsequently, the sacrificial layer 13 is removed, which becomes the gap 7 (FIG. 2K). Firstly, a resist mask which has been formed with the photolithographic technology is provided, and an etching hole for etching the sacrificial layer 13 is formed in the vibrating membrane 8 with dry etching in which $CF_4$ is used as an etching gas. In FIG. 2K, the etching hole is omitted for the simplification of the drawing. Then, the sacrificial layer is selectively removed through the etching hole, by immersing the substrate into the etchant of the chromic acid mixture, which is the etchant for the sacrificial layer 13, thus the gap 7 is formed. After the sacrificial layer 13 has been completely removed, the gap is sufficiently washed with water, the water is replaced by isopropyl alcohol, the gap is finally dried with a fluorine-based low surface tension solvent (HFE7100, made by Sumitomo 3M Limited), and thereby the gap 7 is formed.

Figure 2L:
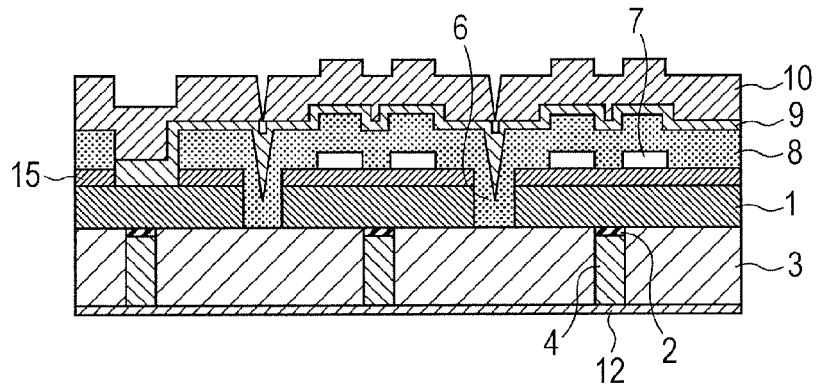

Next, the etching hole which has been used for forming the gap 7 is sealed. The sealing film 10 is formed on the vibrating membrane 8 in which the etching hole has been formed, with a plasma CVD method (FIG. 2L). An SiN film 10 with a film thickness of approximately 700 nm can be formed by film formation in a mixed gas of $SiH_4$, $N_2$ and $NH_3$ at a substrate heating temperature of 350° C. and a chamber pressure of 1.6 Torr for approximately 320 seconds. The gap 7 which has been sealed in this operation becomes a void having an approximately equal pressure to the pressure of the above described chamber.

Figure 2M:
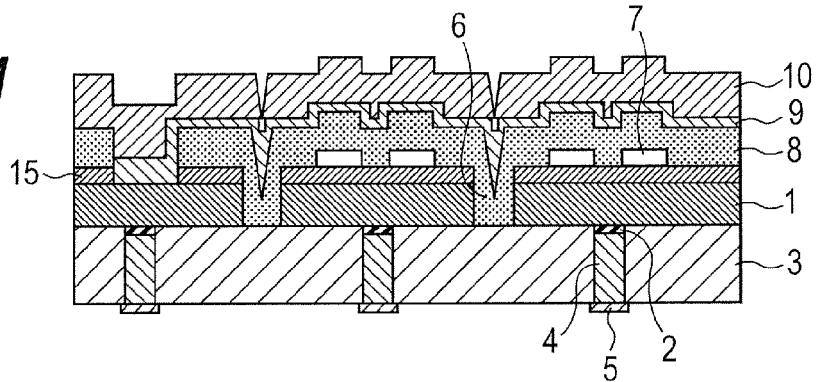

Finally, a Ti film for protection the rear surface is removed, and an under bump metal is formed under the through wiring 4 (FIG. 2M). In the operation of removing the Ti film, Ti is etched by a Ti etchant (WLC-T, made by MITSUBISHI GAS CHEMICAL COMPANY, INC.) which has etching selectivity for the Ti film but not having etching selectivity for the Cu that forms the through wiring. Thereby, only the Ti film (protective material 12) on the rear surface can be removed while a selection ratio of the Ti film to Cu is kept. The CMUT is completed by further forming an Au/Ni/Ti film which becomes the under bump metal 5 on a portion of coming in contact with the through wiring 4, by using a stencil mask.

By being produced in the above described process, an electromechanical transducer can be produced/developed on a structure of a substrate having a flat surface, without being affected by a step between the through wiring and the substrate, which occasionally occurs when the through wiring is formed, and consequently the electromechanical transducers of which the dispersion of performance has been decreased can be produced.

Exemplary Embodiment 2

In a manufacturing method of Exemplary Embodiment 2, an insulative member which is an insulating layer is formed by applying a resin or a glass material having photosensitive characteristics onto a low-resistance Si substrate. Then, by patterning a through hole in the insulative member, a structure of a substrate to which a through wiring is connected is prepared, and CMUT is produced on the structure.

In the present exemplary embodiment, polyimide (commercially available product made by Toray Industries, Inc., Asahi Kasei Corporation, Hitachi Chemical Company, Ltd. or the like) is used as a photosensitive resin material. Although the polyimide is used here as the photosensitive resin material, KI-1000 series (made by Hitachi Chemical Company, Ltd.), TMMR (made by TOKYO OHKA KOGYO CO., LTD.), SU-8 (made by Kayaku MicroChem Corporation) and the like can also be used. Furthermore, a photosensitive dry film (commercial product made by Hitachi, Ltd., Asahi Kasei Corporation, TOKYO OHKA KOGYO CO., LTD. or the like) can also be used. However, in the operation of film-forming an SiN film of a vibrating membrane 8 to be film-formed with a plasma CVD method, it is necessary to adjust film formation conditions according to the heat-resistant temperature of each resin material. Although a film formation temperature of the vibrating membrane 8 is set at 350° C. in the present exemplary embodiment, if the film formation temperature is 300° C. or higher, the vibrating membrane having adequate mechanical performance and insulation performance can be formed.

Figure 3A:
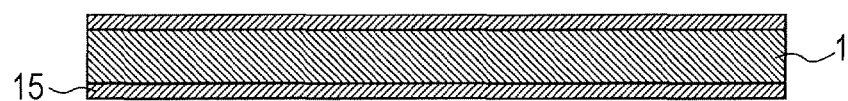
FIGS. 3A, 3B, 3C, 3D and 3E are cross-sectional views for describing a process flow of Exemplary Embodiment of the method for manufacturing the electromechanical transducer.

FIGS. 3A to 3E illustrate a process flow of the present exemplary embodiment. Firstly, in a process of connecting the through wiring to the substrate, a substrate 1 illustrated in FIG. 3A is used in the present exemplary embodiment, which is a Si substrate having low resistivity. Since the substrate 1 serves also as a first electrode, it is desirable that the substrate 1 has small surface roughness and low resistivity, similarly to that in Exemplary Embodiment 1. Specifically, it is desirable that the substrate has an Rms of 0.5 nm or less and a resistivity of 0.02 Ωcm or less.

Figure 3B:
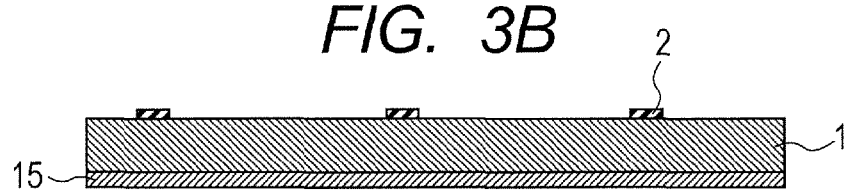
Figure 3C:
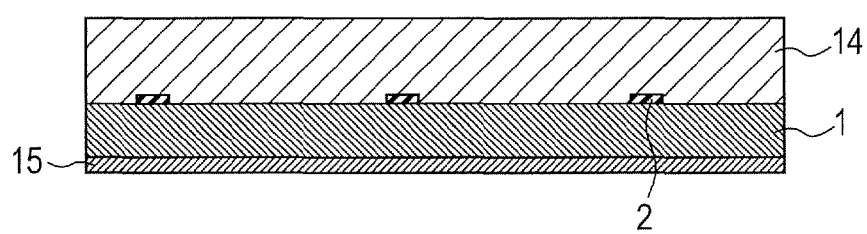
Figure 3D:
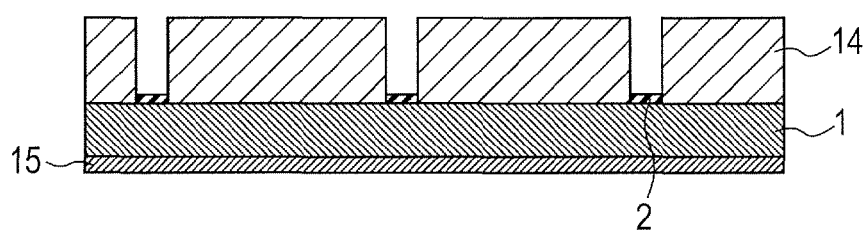
Figure 3E:
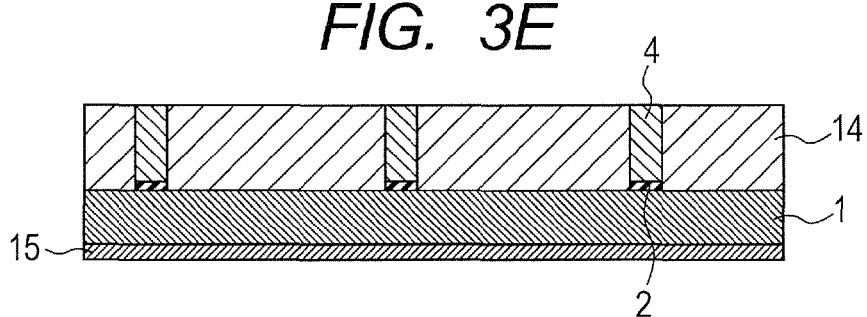

Subsequently, an insulating layer 15 which is a thermal oxide film is formed on the substrate 1 so as to be 1 μm, and an ohmic metal 2 for having an ohmic contact is further formed on the rear surface of the substrate by film formation and patterning. (FIG. 3B). These operations are similar to those in FIG. 2A and FIG. 2B of Exemplary Embodiment 1. Next, a photosensitive polyimide solution which becomes an insulative member 14 provided with the through wiring is uniformly applied onto the rear surface of the substrate 1 so as to have a thickness of 50 μm with a spin coating method, and is heated and dried on a hot plate (FIG. 3C). Furthermore, the solution is exposed to light through a photomask with a photolithographic technology and it is developed with a developer of 2.38% TMAH (tetramethyl ammonium hydroxide), and thereby the through hole is formed so as to correspond to the ohmic metal 2. Subsequently, the through hole for the through wiring 4 is provided in the insulative member by heating and curing the applied film in a nitrogen atmosphere of 300° C. so as to promote imidization (FIG. 3D).

When the through hole provided as described above is filled with a metal in a similar operation to that of FIG. 2D of Exemplary Embodiment 1 (FIG. 3E), a structure of the substrate to which the through wiring 4 is connected is formed by operations down to the present operation. As for the following operations, similar operations to those of FIG. 2E to FIG. 2M of Exemplary Embodiment 1 are conducted on the structure of the substrate, and then CMUT having the through wiring 4 is formed.

By the above described operations as well, an electromechanical transducer can be produced/developed on the structure of the substrate having a flat surface without being affected by the step between the through wiring and the substrate, which occasionally occurs when the through wiring is formed, and accordingly the electromechanical transducers of which the dispersion of performance has been decreased can be produced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-186731, filed Aug. 30, 2011, which is hereby incorporated by reference herein in its entirety.

What is claimed is:

1. A method for manufacturing an electromechanical transducer comprising:
   Step A: obtaining a structure in which an insulative portion having a through hole therein is bonded onto an electroconductive substrate;
   Step B: filling the through hole with an electroconductive material to form a through wiring which is electrically connected with the electroconductive substrate after the Step (A); and
   Step C: using the electroconductive substrate as a first electrode, forming a plurality of vibrating membrane portions including a second electrode, which opposes to the first electrode through a plurality of gaps, on an opposite side of the first electrode to the side having the insulative portion after the Step (B), thereby forming a plurality of cells.

2. The method for manufacturing the electromechanical transducer according to claim 1, wherein the Step (A) comprises bonding an insulative substrate that will be the insulative portion having the through hole formed therein onto the electroconductive substrate.

3. The method for manufacturing the electromechanical transducer according to claim 1, wherein the Step (A) comprises forming a photosensitive insulative portion on the electroconductive substrate to bond the insulative portion to the electroconductive substrate; and forming the through hole, which reaches the electroconductive substrate, in the photosensitive insulative portion.

4. The method for manufacturing the electromechanical transducer according to claim 1, further comprising electrically separating the first electrode for every element containing at least one cell.

5. The method for manufacturing the electromechanical transducer according to claim 4, further comprising forming an electrically separating groove in the first electrode.

6. The method for manufacturing the electromechanical transducer according to claim 1, wherein each of the vibrating membrane portions comprises a membrane and the second electrode formed on the membrane.

7. The method for manufacturing the electromechanical transducer according to claim 1, further comprising electrically connecting one or more through wirings to one of the first electrode which has been separated for every element.

8. The method for manufacturing the electromechanical transducer according to claim 1, wherein the electroconductive substrate is a Si substrate with a resistivity of 0.02 Ωcm or less.

9. The method for manufacturing the electromechanical transducer according to claim 1, further comprising polishing a surface of the insulative portion after the Step (B).

10. The method for manufacturing the electromechanical transducer according to claim 9, wherein the polishing step comprises Chemical Mechanical Polishing (CMP).

* * * * *